US007322252B1

(12) United States Patent
Rodgers

(10) Patent No.: US 7,322,252 B1
(45) Date of Patent: Jan. 29, 2008

(54) APPARATUS FOR TAKING MEASUREMENTS IN ACCESS MANHOLES

(76) Inventor: Matthew E. Rodgers, 2000 Birmingham Ave., West Sacramento, CA (US) 95691

( * ) Notice: Subject to any disclaimer, the term of this patent is extended or adjusted under 35 U.S.C. 154(b) by 0 days.

(21) Appl. No.: 11/026,381

(22) Filed: Dec. 30, 2004

(51) Int. Cl.
G01L 3/00 (2006.01)
G01B 3/00 (2006.01)
G01B 5/00 (2006.01)

(52) U.S. Cl. .................................... 73/862.08; 33/542
(58) Field of Classification Search ............ 73/862.08; 33/542
See application file for complete search history.

(56) References Cited

U.S. PATENT DOCUMENTS

| 2,950,900 | A | * | 8/1960 | Wynes | 166/117.6 |
| 3,143,170 | A | * | 8/1964 | Nelson | 166/255.2 |
| 3,588,255 | A | * | 6/1971 | Alexander | 356/153 |
| 3,995,373 | A | | 12/1976 | Brumbelow | |
| 4,462,166 | A | * | 7/1984 | Furlong | 33/416 |
| 4,536,960 | A | | 8/1985 | Muti | |
| 4,744,151 | A | | 5/1988 | Wisniewski | |
| 4,941,643 | A | * | 7/1990 | Ditcher | 249/145 |
| 4,982,505 | A | * | 1/1991 | Pocci | 33/542 |
| 5,309,644 | A | * | 5/1994 | Robinson et al. | 33/293 |
| 5,437,830 | A | * | 8/1995 | Calandra et al. | 264/296 |
| 6,425,186 | B1 | * | 7/2002 | Oliver | 33/293 |
| 6,920,394 | B2 | * | 7/2005 | Johnson | 702/6 |
| 7,000,328 | B1 | * | 2/2006 | Iliff | 33/544 |
| 2003/0226272 | A1 | * | 12/2003 | Finefield | 33/542 |
| 2005/0005467 | A1 | * | 1/2005 | Hannel | 33/542 |

* cited by examiner

Primary Examiner—Michael Cygan
Assistant Examiner—Octavia Davis
(74) Attorney, Agent, or Firm—Todd N. Hathaway

(57) ABSTRACT

An apparatus for measuring the location and annular orientation of pipe inverts and other features in manholes. An elongate, telescoping rod is supported centrally in the manhole opening by a pivot assembly that permits the rod to both rotate in the horizontal plane and pivot in the vertical plane. A laterally-extending foot member on the lower end of the telescoping rod is inserted into the openings of the inverts for measurement. Electronic angle sensors record the length and orientation of the rod member at each measurement point, from which the location and angular orientation of the invert opening or other feature is then calculated.

24 Claims, 13 Drawing Sheets

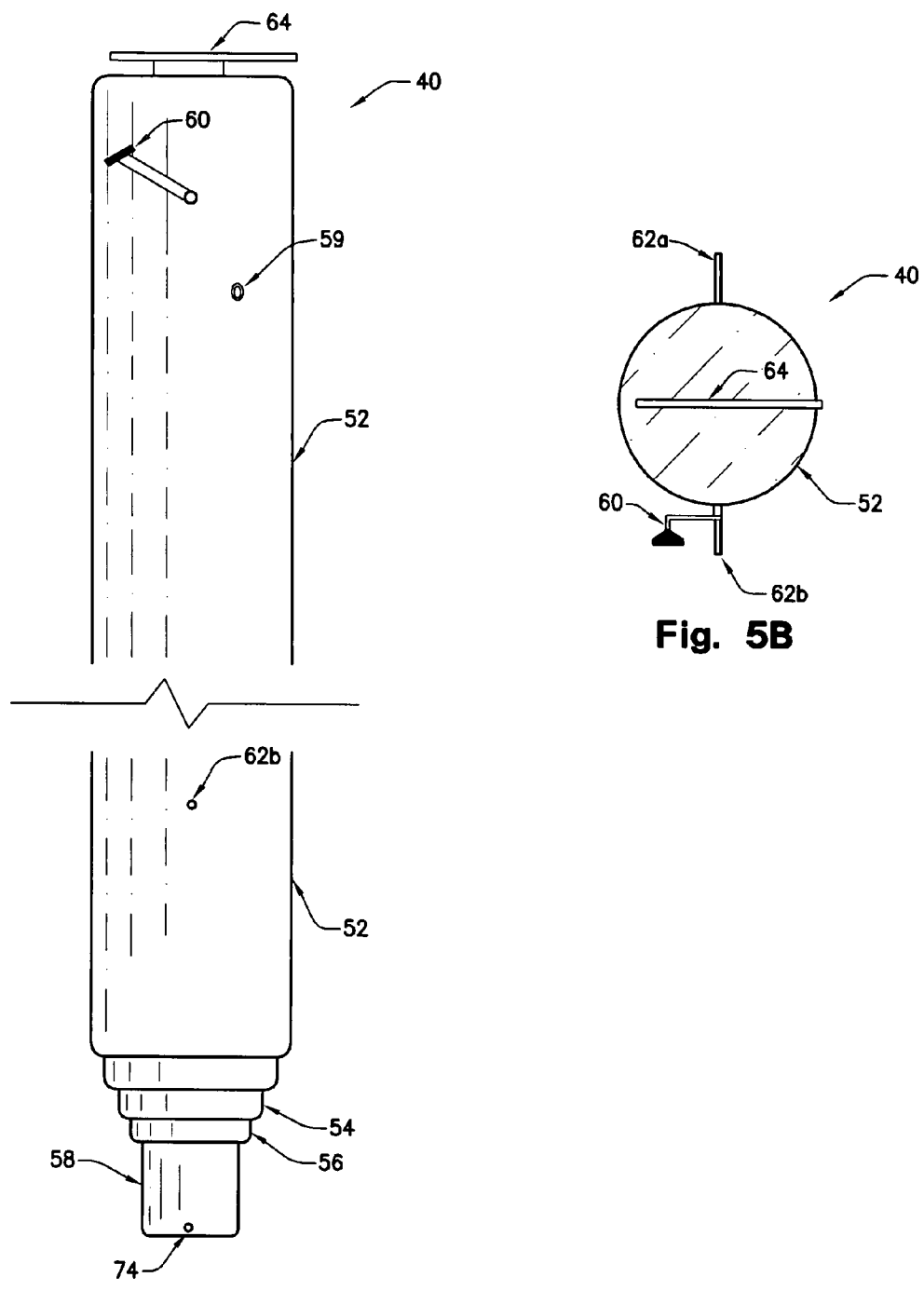

APPARATUS FOR TAKING MEASUREMENTS IN ACCESS MANHOLES

BACKGROUND a. Field of the Invention

The present invention relates generally to surveying instruments for taking measurements in utility manholes, and, more particularly, to an apparatus for taking measurements of inverts and other features within a manhole using a rotating rod that is mounted centrally within the opening of the manhole for obtaining measurements of the height, horizontal distance and angular position of the features.

b. Related Art

Certain utility systems, such as sewer systems, employ a multiplicity of conduits that pass beneath streets and built-up areas and that meet and are accessed at manholes at suitable locations. In the case of sewer systems, the pipes, where they enter and leave the manholes, are referred to as "inverts".

For a variety of reasons, it is essential that the municipality or another utility owner/operator have accurate data concerning the location and orientation of the various inverts and/or other features in each manhole within its system. For example, it is critical to know the height and angular orientation of each invert in a system when planning re-lining of sewers or other renovation work. In many or most cases however, such data is not readily available. For example, in many older municipalities the inverts have been installed successively over a period of decades (or even centuries), often in an almost haphazard fashion and with little or no records being kept concerning their location or orientation. Even in comparatively modern systems, record-keeping and measurement data are often scanty or non-existent.

To address these issues, many municipalities and other utility owners have undertaken comprehensive mapping of their sewers and other systems, including measuring the height and angular orientation of all of the inverts that are accessible at the manholes. Since even a modest-sized municipality can have systems with literally thousands of pipes, inverts and so on, the scale of the mapping projects is massive, reaching extreme proportions in the case of major metropolitan areas. Moreover, the measurements must be precise, or else the collected data is useless.

The cost and difficulty of the mapping projects has been significantly compounded by the limitations of existing measuring equipment. On the whole, this has consisted of comparatively primitive, manually-operated surveying tools. FIGS. 1-2 show a typical arrangement, in which the measuring tool 10 is composed of a graduated rod 12 having a laterally-extending foot 14 mounted to its lower end. The rod is held by an operator 16 and the foot is inserted through the access opening 18 into the interior of the manhole 20, as is shown in FIG. 1. The operator guides the foot, visually and by feel, into the invert openings 22, 24, as shown in FIG. 2. The operator then reads the height from the rod, where this meets the lip of the opening 18, and estimates the angular orientation of the invert.

It will be readily understood that taking measurements in the foregoing manner is not only labor-intensive but is also fraught with opportunity for inaccuracies. It is difficult or impossible for the operator to simultaneously hold/manipulate the rod and record the measurements, so that frequently a two-man team is required and even then the process is slow and laborious. Also, the accuracy of the measurements is highly suspect: for example, the accuracy of the height measurement is dependent on the rod being held precisely upright and at the exact reference point on the manhole lid/seat (which frequently is not flat), which is especially difficult in the cases of large-diameter manholes and angled inverts. Furthermore, although certain expediencies have been adopted by some operators, judging the angular orientation of the inverts is a somewhat subjective art at best, to the point that measurements taken at a single manhole may vary significantly from one operator to the next. Still further, pipe out-of-roundness and manhole eccentricity cannot be effectively measured using this method. Even after the measurements have been obtained, the steps of sketching the manhole and transferring the typically handwritten measurements to an electronic database, which is essential for their subsequent use, is itself a laborious process and offers yet additional opportunities for mistakes and errors.

In combination, these factors present a serious problem for the entity that is conducting the mapping operation. The multiple steps and labor-intensive character of the process translate to a very high cost. Moreover, even when the mapping has been completed the accuracy of the data remains suspect, to the point where the utility owner often cannot rely on it and a second set of measurements must be taken before commencing a project, since the financial consequences of erroneous measurements can be catastrophic in a major project, such as the installation or renovation of a sewer line.

Accordingly, there exists a need for an apparatus for measuring both the elevation and angular orientation of inverts in a manhole that obtains the measurements in a rapid and efficient manner. Furthermore, there exists a need for such an apparatus that renders it easy for only a single operator to both take and record the measurements. Still further, there exists a need for such an apparatus that is capable of obtaining the height and angular orientation measurements of inverts with a high degree of accuracy. Still further, there exists a need for such an apparatus that is capable of collecting the measurement data in electronic form, so as to eliminate the need for the intermediate step of translating written or other manually-entered information to an electronic database.

SUMMARY OF THE INVENTION

The present invention has solved the problems cited above, and is an apparatus for obtaining measurements in a manhole, comprising broadly: a rod member for extending downwardly into a manhole; a frame for supporting the rod member centrally in an axis opening of the manhole; means mounted to the rod member for obtaining a measurement of a height of a selected object in the manhole in a vertical plane; and means operatively connected to the rod member for obtaining a measurement of the angular position of the selected object in the manhole in a horizontal plane.

The means operatively connected to the rod member for obtaining measurement of the angular position of the selected point in the manhole in the horizontal plane may comprise a bearing that interconnects the rod member and the frame so as to permit rotation of the rod member in the horizontal plane, and means for determining an angular position of the rod member in the horizontal plane.

The means for determining a height of a selected object in the manhole may comprise a contact member on a lower portion of the rod member for contacting the selected object in the manhole, means for selectively adjusting the height of the contact member on the rod member, a bearing interconnecting the rod member and the frame so as to permit pivoting movement of the rod member in the vertical plane, and means for determining an angular position of the rod member in the vertical plane. The means for adjusting the height of the contact member and the rod member may comprise means for selectively extending and retracting the lower end portion of the rod member on which the contact member is mounted.

Alternatively, the means for determining the height of the selected object in the manhole may comprise a sensor mounted to a lower end portion of the rod member for sensing a level of the selected object in the manhole relative to the sensor, and means for selectively adjusting a vertical height of the sensor on the rod member so as to determine a point on the rod member that is substantially level in height with the selected object. The means for obtaining measurement of the height of the selected object may further comprise means for determining a length of the rod member from the frame that supports the rod member to the point on the rod member that is level with the selected object. The sensor may comprise a camera for visually sensing the selected object in the manhole.

The apparatus may further comprise means for determining a horizontal distance from the selected object in the manhole to the point on the rod member that is level with the selected object. The means for determining the horizontal distance from the selected object to the point on the rod member that is level with the object may comprise an electronic distance measuring device that is mounted to the lower end portion of the rod member. The electronic distance measuring device may comprise a laser distance meter.

In a preferred embodiment, the apparatus comprises an extensible rod member having a lower end for extending into the manhole, a bearing assembly mounted to the rod member so that the rod member is selectively rotatable in a horizontal plane and pivotable in a vertical plane, and means for supporting the bearing assembly in an access opening of the manhole so that the rod member is located centrally therein, so that the lower end of the rod member can be extended, rotated and pivoted to selected measurement points within the manhole.

The apparatus may further comprise means for determining a length and angular orientation of the rod member when the rod member is in contact with a measurement point in the manhole, so that a location of the measurement point can be calculated therefrom. There may be at least one angle sensor that is mounted to the bearing assembly and operatively coupled to the rod member so as to determine an angular orientation of the rod member relative to the bearing assembly. The at least one angle sensor may comprise a first angle sensor operatively coupled to a horizontal axis pivot portion of the bearing assembly for determining an angular orientation of a rod member in a vertical plane, and a second angle sensor operatively coupled to a vertical axis pivot portion of the bearing assembly for determining an angular orientation of the rod member in a horizontal plane.

The apparatus may further comprise a drive mechanism for selectively extending and retracting the rod member, and a sensor operatively coupled to the drive mechanism for determining a length of the rod member from operation thereof. The drive mechanism may comprise a manually rotatable crank for extending and retracting the rod member. The rod member may comprise a telescoping rod assembly having a plurality of nested, tubular rod segments.

The apparatus may further comprise a laterally extending foot member mounted to the lower end of the rod member for being inserted into openings of inverts in a manhole. There may further be at least one pressure sensor mounted on an outer end of the foot member for indicating physical contact between the foot member and a measurement point within the manhole. The at least one pressure sensor may comprise a plurality of pressure sensors mounted at spaced locations around the outer end of a foot member for indicating a side of the foot member that is in contact with the measurement point.

The bearing assembly may comprise an outer support for being supported from the manhole opening, an inner support in engagement with the outer support for rotation in a horizontal plane, the inner support having a central opening with the rod member passing generally vertically therethrough, and a horizontal axle supporting the rod member from the inner support for pivoting in a vertical plane.

The apparatus may further comprise a plurality of legs mounted to the outer support for supporting the bearing assembly centrally in the opening of the manhole. The inner support may comprise an inner ring having the central opening and the outer support may comprise an outer ring having the legs mounted thereto.

The apparatus may further comprise means for adjusting the bearing assembly to a horizontal orientation. The means for adjusting the bearing assembly to a horizontal orientation may comprise a plurality of adjuster screws, each of the adjuster screws extending generally vertically through an outer end of one of the legs in threaded engagement therewith and having a lower end for resting on a lip of the manhole opening.

The apparatus may further comprise means for adjusting the inner support relative to the outer support to a level orientation. The means for adjusting the inner support relative to the outer support may comprise at least one horizontal roller member mounted to the outer support and having an upper side in engagement with a lower surface of the inner support, and means for adjusting a height of the roller member relative to the outer support so as to adjust to an angle at which the inner support is supported for rotation thereon.

The at least one angle sensor of the apparatus may comprise an electronic angle sensor that provides a digital output representing the angular orientation of the rod member. The apparatus may further comprise an electronic memory for storing the digital outputs for a plurality of measuring points.

These and other features and advantages of the present invention will be apparent from a reading of the following detailed description with reference to the accompanying drawings.

BRIEF DESCRIPTION OF THE DRAWINGS

FIGS. 5A-5B are, respectively, elevational and plan views of the telescoping rod member of the measurement apparatus of FIGS. 3-4;

DETAILED DESCRIPTION a. Overview

Figure 1:
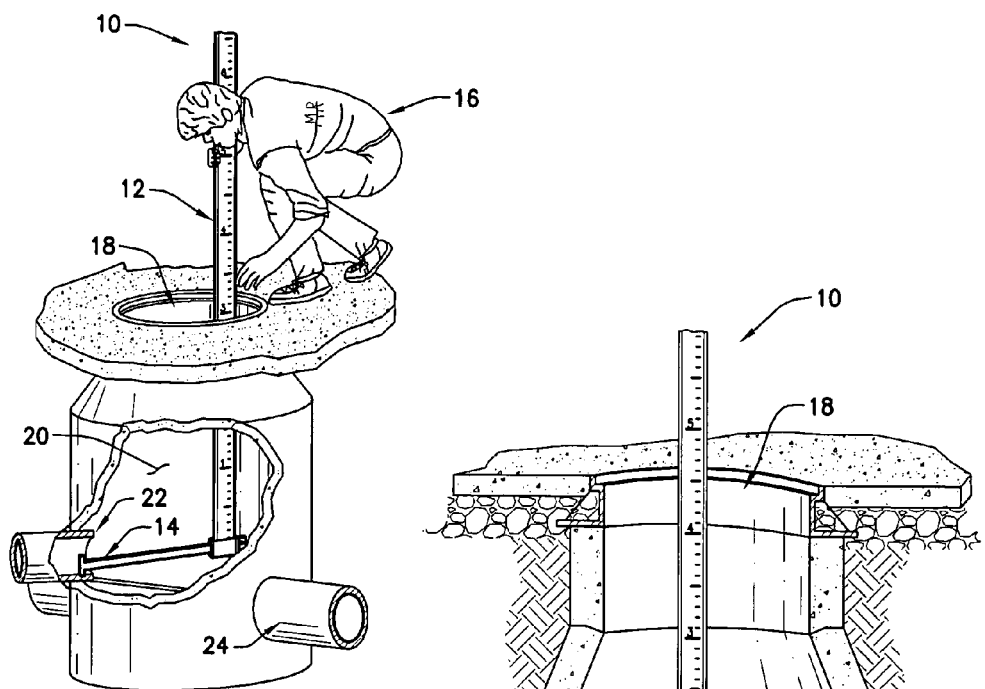
FIG. 1 is a perspective view of a measurement apparatus in accordance with the prior art, consisting of a graduated rod having an angled foot, showing the manner in which this is used by a worker to locate and measure inverts in a manhole.
Figure 2:
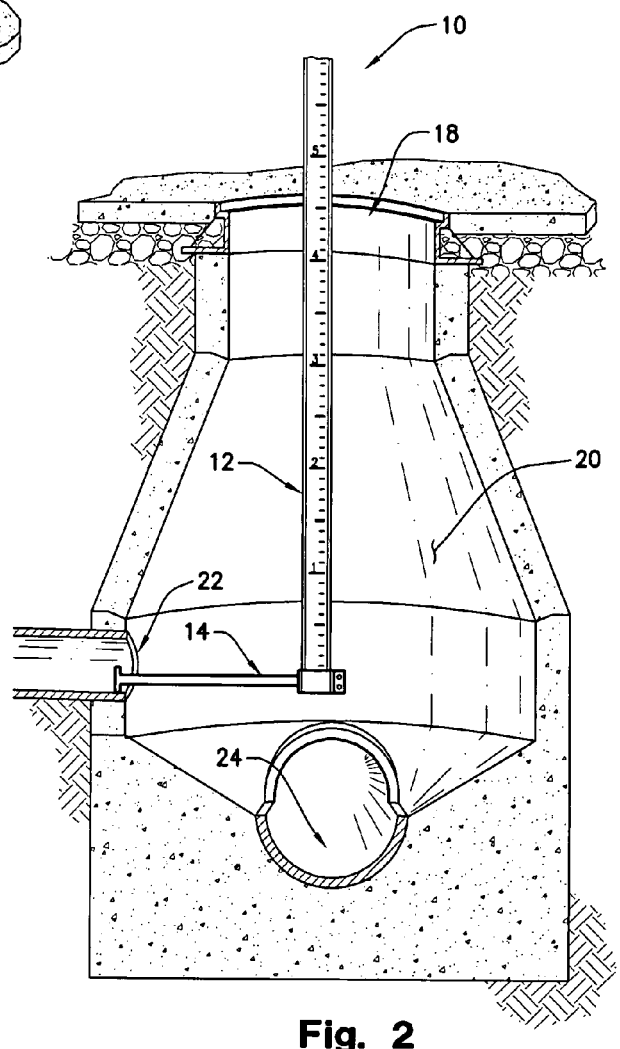
FIG. 2 is an elevational view of the prior art measurement tool of FIG. 1, with the manhole being shown in cross section, showing the manner in which the foot on the lower end of the measuring tool is inserted into the opening of an invert so as to obtain measurements therefrom.
Figure 3:
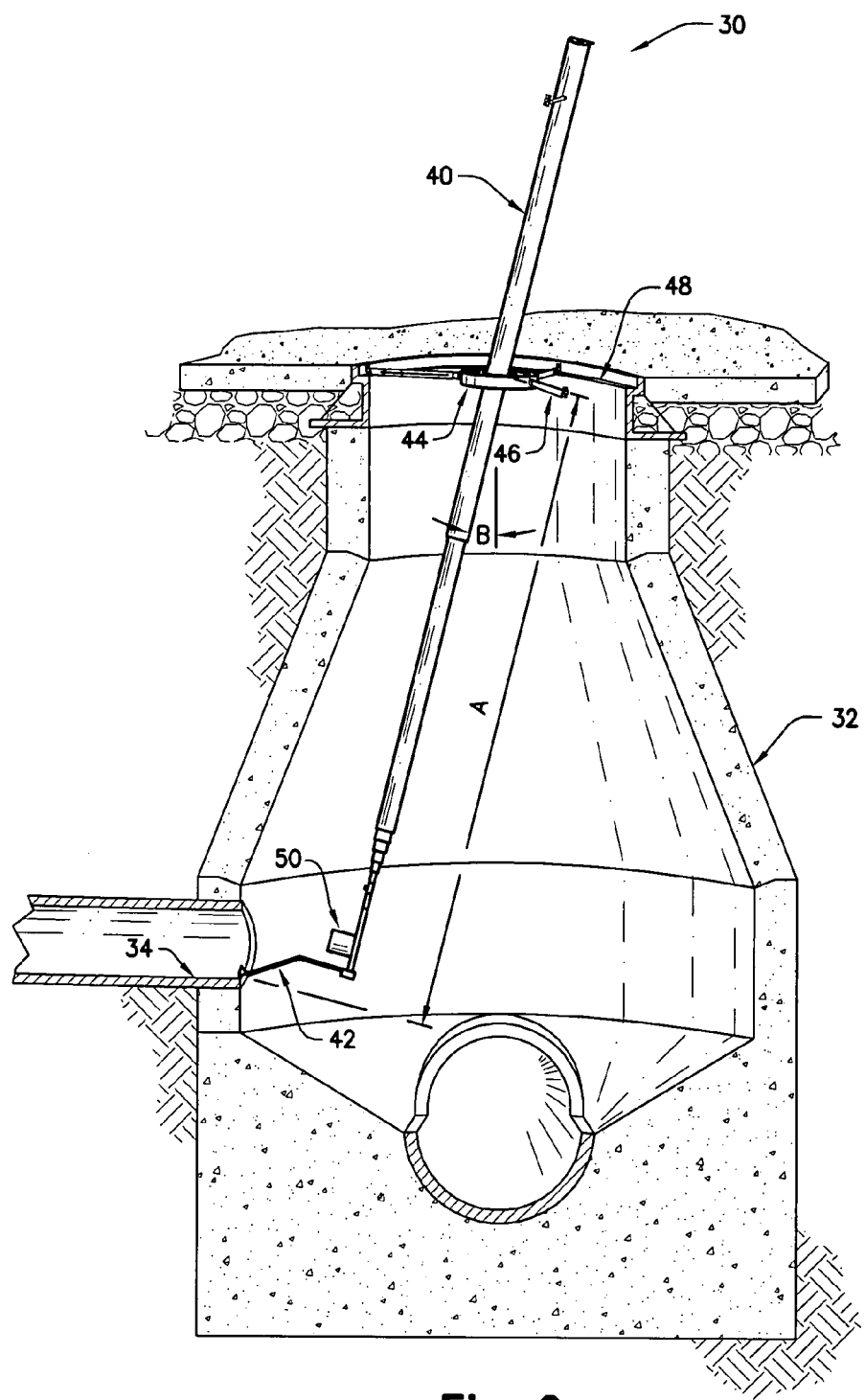
FIG. 3 is an elevational view of the measuring apparatus of the present invention, showing the manner in which the apparatus is installed in a manhole for obtaining measurements of inverts or other features or objects therein, the manhole being shown in cross section.

FIG. 3 shows a measurement apparatus 30 in accordance with a first embodiment of the present invention, installed in a manhole 32 so as to obtain measurements of a selected feature therein, in this case, the invert 34 of a pipe leading into the manhole. The manhole 32 that is shown in FIG. 1 has a generally conventional configuration, with a main channel formed in the base at the bottom of the cylindrical barrel, and a tapered cone leading upwardly through a narrowed chimney to the frame and lid at the opening; however, it will be understood that the manhole may be of any type having a suitable opening at its upper end.

As can be seen, the measurement apparatus 30 includes an elongate, telescoping rod member 40 having a foot member 42 mounted to its lower end. As will be described in greater detail below, the rod member is supported for both rotating and pivoting movement in a double-ring assembly 44, the latter being supported centrally in the manhole opening by a plurality of legs 46 that engage the manhole seat 48 at the opening. A camera 50 is optionally mounted to the lower end of the telescoping rod member, adjacent the foot member 42.

Figure 4:
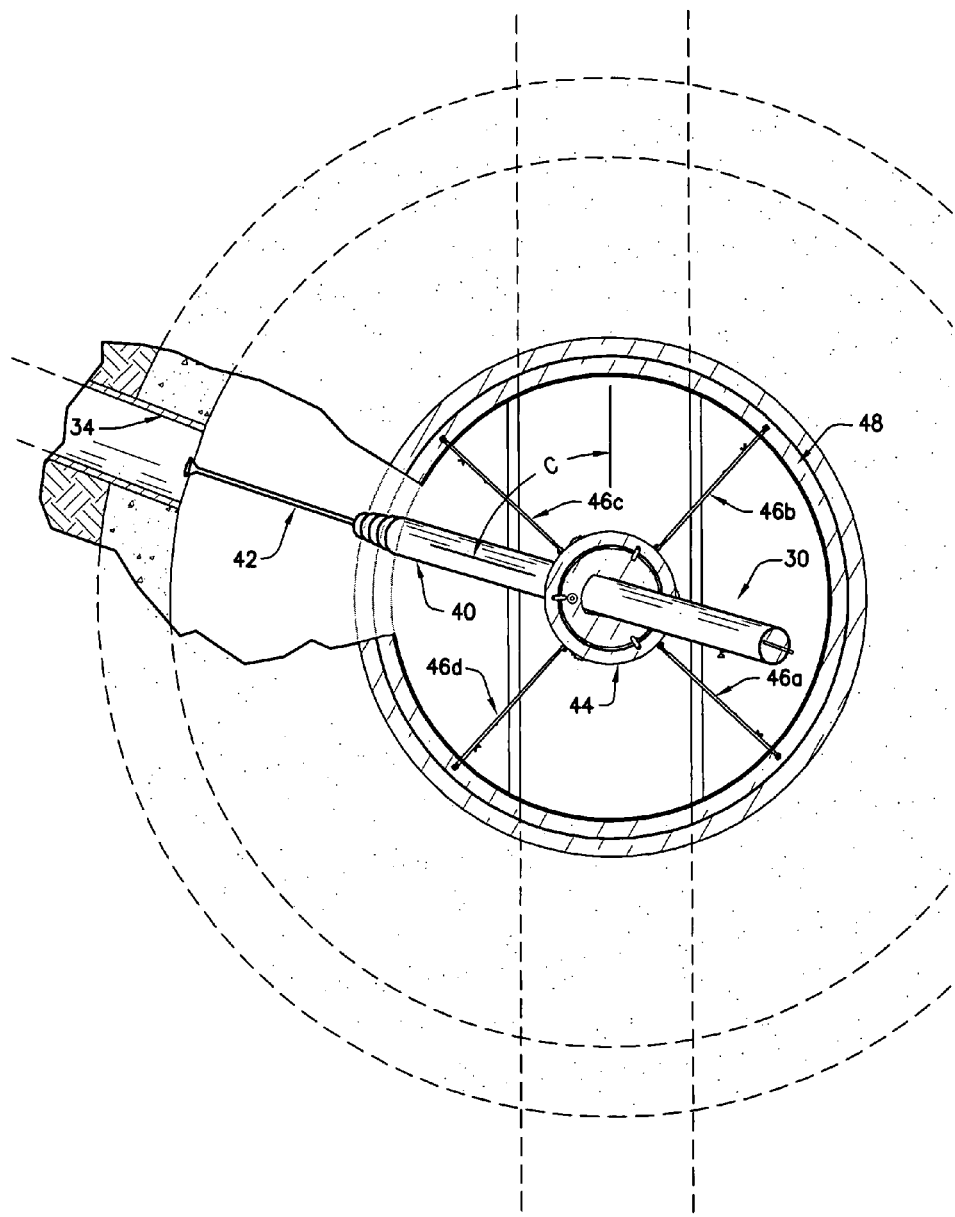
FIG. 4 is a top, plan view of the measurement apparatus and manhole of FIG. 3, showing the manner in which the centrally located rod member of the apparatus is rotated and pivoted to obtain accurate measurements to points in the manhole.

The telescoping feature of the rod member 40 enables its length "A" below the manhole opening to be adjusted for objects at different elevations. The rod member is mounted to the inner ring of the dual-ring assembly 44, on a horizontal pivot axis that permits the rod to be pivoted to an angle "B" relative to vertical. As is shown in FIG. 4, the inner ring is in turn supported on the outer ring for rotation about the vertical axis, so that the rod member can also be rotated to an angle "C" in the horizontal plane. In this manner, the rod member can be extended, pivoted and rotated so that the foot member 42 on its lower end can be aligned with the opening of the invert (or other object) at any location in the manhole, as is shown in FIGS. 3-4.

b. Structure

As can be seen in FIGS. 5A-5B, the rod member 40 includes an elongate, tubular, primary housing 52 having a plurality of (e.g., three) smaller-diameter sections 54, 56, 58 nested in a telescoping manner in its lower end. The terminal telescoping member is a smaller diameter rod member 58 that projects downwardly from the bottom of the assembly and provides a mounting area for attachment of the foot member 42, as will be described in greater detail below. The telescoping sections of the rod member are selectively extensible/retractable using a crank handle 60, which operates an internal cable and pulleys (not shown) or other suitable mechanism. The rod assembly is preferably constructed of a tubular material that is relatively light in weight and exhibits a high degree of rigidity and resistance to bending, such as tubular metal or fiberglass, so as to ensure the accuracy of the readings that are obtained therewith.

As can be seen in FIG. 5A and also FIG. 5B, a pair of pivot pins 62a, 62b are mounted on a common axis at about the lengthwise midpoint to about the bottom ⅓ of the main tube of the rod member. As will be described in greater detail below, the pivot pins are received in corresponding openings in the inner ring of the dual ring assembly to form the horizontal pivot axis for the assembly.

Also included is a sight 64 that is mounted across the upper end of the tubular housing 52, perpendicular to the axis of the pivot pins 62a, 62b, and which is used to set the horizontal reference angle (e.g., by pointing towards a known horizontal reference, such as the next downstream manhole).

Figure 6A:
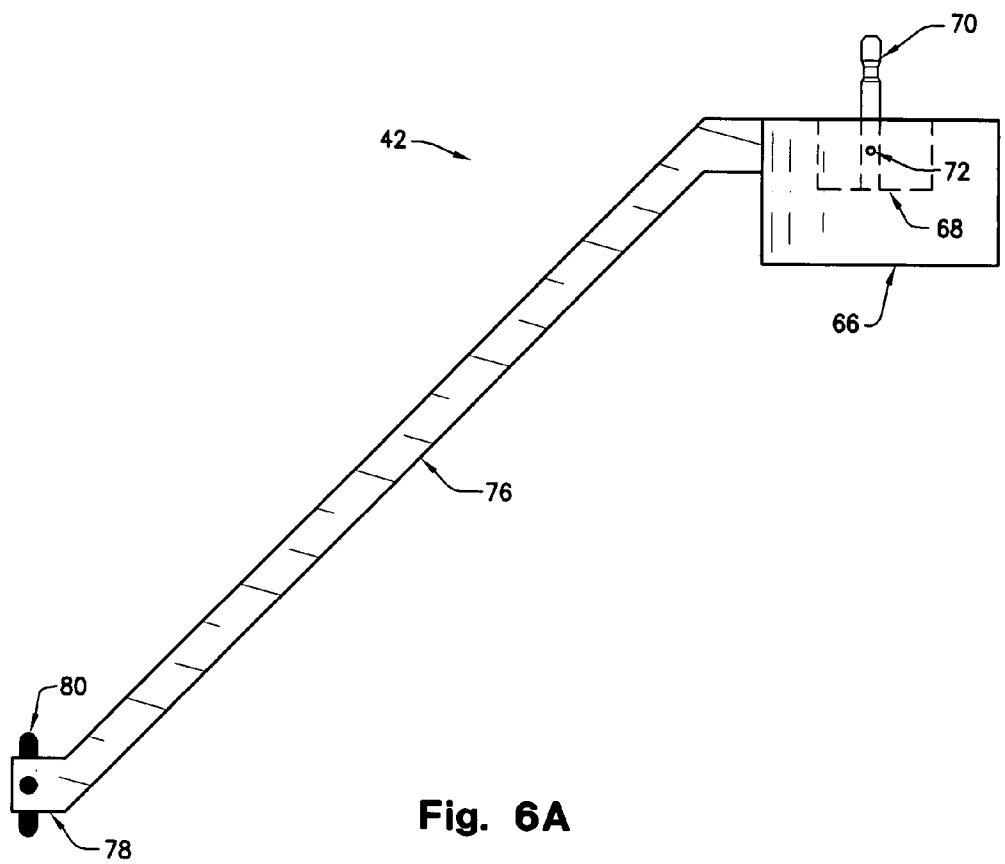
FIGS. 6A-6B are, respectively, elevational and plan views of the foot member of the measurement apparatus of FIGS. 3-4, the foot portion being mountable to the lower end of the rod member as seen in FIG. 3.
Figure 6B:
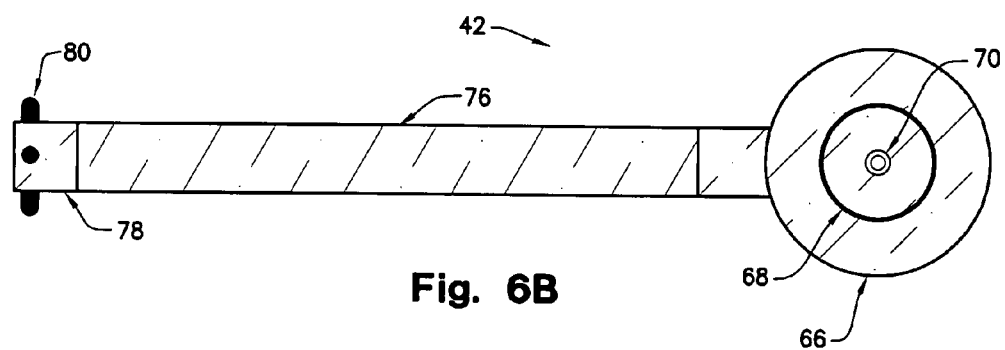

FIGS. 6A-6B, in turn, show the foot member 42 in greater detail. As can be seen, the foot member includes a base portion 66 having a mounting socket 68 for receiving the lower end of the extension rod 58 (see FIG. 5A), and a centering pin 70 that fits within and engages a corresponding socket (not shown) in the end of the rod. When thus assembled, a transverse pin (not shown) is passed through cooperating bores 72, 74 so as to lock the foot and rod members together.

An arm portion 76 extends horizontally from the mounting portion and then downwardly at an angle (e.g., 45°), before terminating in a short horizontal tip 78. The downwardly-angled configuration of the arm portion provides the advantage of allowing the tip portion 78 to reach into the openings of inverts near or at the bottom of the manhole without the lower end of the rod striking bottom in a manner that would interfere with taking the measurement.

When taking an initial measurement the horizontal tip member may be centered within the bottom of the invert, as shown in FIGS. 3-4. However, in many instances it is desirable to measure to the top and sides of the opening as well. Although this can be done by "feel", the horizontal tip 78 of the foot member may advantageously be provided with an array of contact sensors 80 bounded on its top, bottom and sides for indicating to the operator when contact has been made with the corresponding portions of the opening. Additionally, sensors for flow, chemicals or measurements may be attached.

FIGS. 7A-9B illustrate the components of the dual ring assembly 44 that supports the rod member for rotating and pivoting motion. As can be seen, this is made up of an inner ring 82 that fits within and is supported for rotation by an outer ring 84. Although the inner and outer supports are ring-shaped (i.e., circular) in the preferred embodiment, it will be understood that other shapes may be employed so long as the inner support is supported on the outer for rotation in a generally horizontal plane.

Figure 7A:
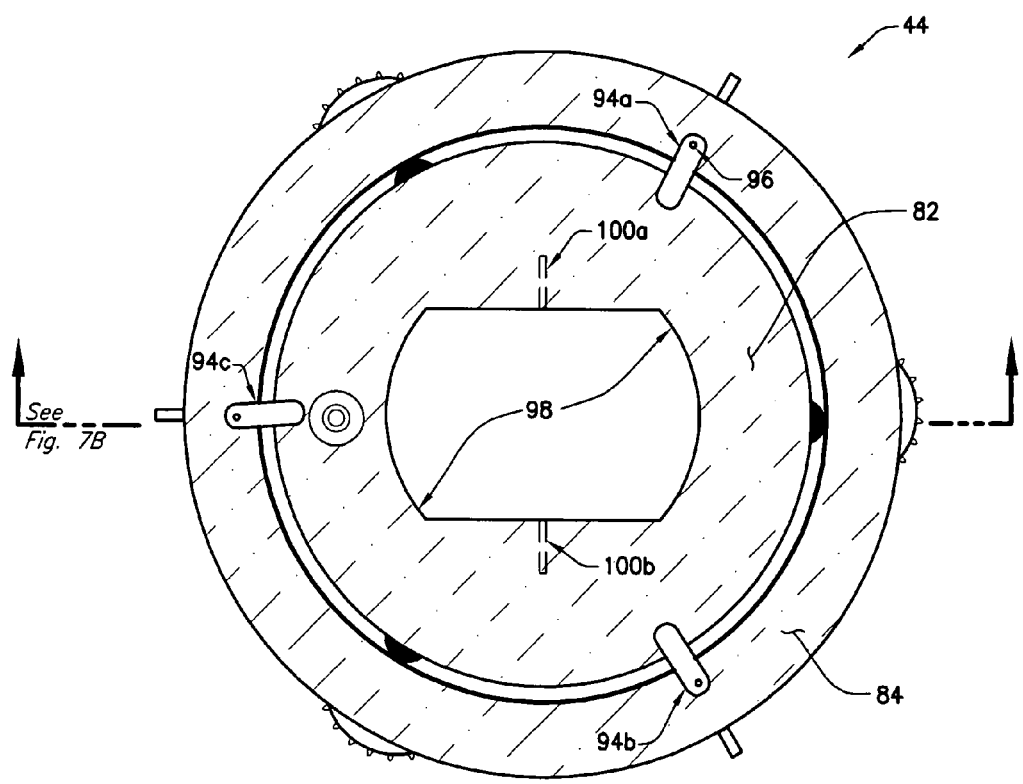
FIGS. 7A-7B are, respectively, plan and cross-sectional views of the dual-ring assembly of the measurement apparatus of FIGS. 3-4, that supports the rod member of the apparatus for rotating and pivoting motion as seen in FIG. 4.
Figure 7B:
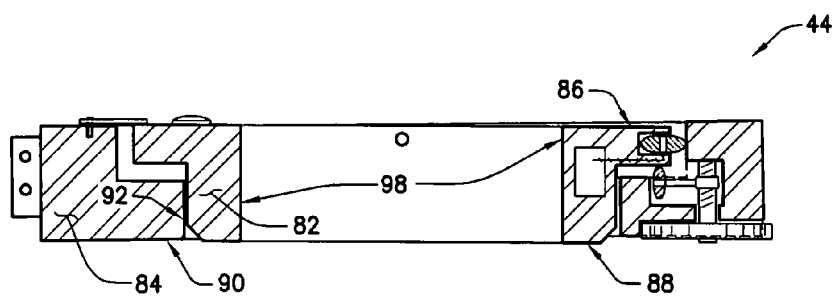

As can be seen in FIG. 7B, the inner ring 82 has an inverted hat shape, with a circumferential, outwardly extending flange portion 86 and a cylindrical, downwardly extending sleeve portion 88. The lower surface of the flange portion is supported by an inwardly-directed flange portion 90 of the outer ring member in sliding engagement therewith, while the sleeve portion 88 extends downwardly in close-fitting, sliding engagement with the main opening 92 of the outer ring member. Spring steel clips 94a-c are mounted to the upper surface of the outer ring and extend inwardly over the upper surface of the inner ring 82 so as to hold the inner and outer rings together during use; the clips are pivotably mounted to the outer ring by pins 96, so that the clips can be pivoted outwardly to permit removal of the inner ring for cleaning or maintenance. It will be understood that, in addition to clips, other mechanisms for maintaining the rings in rotating engagement may be utilized.

Figure 8A:
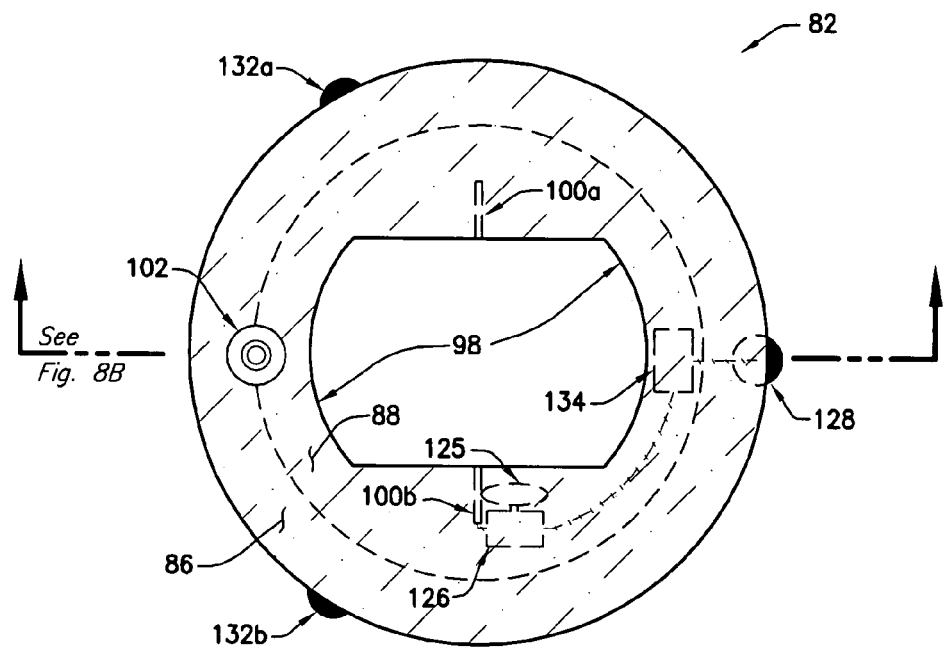
FIGS. 8A-8B are, respectively, plan and cross-sectional views of the inner ring of the dual-ring assembly of FIGS. 7A-7B, that pivotably supports the rod member of the apparatus and rotates within the outer ring of the assembly.

As can be seen in FIG. 7A and also in FIG. 8A, the inner ring includes a central opening 98 that is flanked by coaxially aligned channels 100a, 100b that receive the pivot pins 62a, 62b of the rod member so as to form the horizontal pivot axis, the opening 98 being elongated in the direction perpendicular to the axis in order to accommodate the pivoting motion of the rod (e.g., see FIG. 3). In addition, a bubble level 102 is mounted in the upper surface to aid when adjusting the legs of the apparatus, as will be described in greater detail below.

As can be seen in FIGS. 9A-10B, the outer ring 84 is provided with peripheral, radially aligned mounting brackets 104a-c, that mate with corresponding mounting brackets 106 on each of the leg members 46a-46b, and which are attached thereto by means of bolts or other suitable fasteners. Thus mounted, the legs extend radially from the dual ring assembly to engage the rim of the manhole opening, as shown in FIG. 3.

Figure 10A:
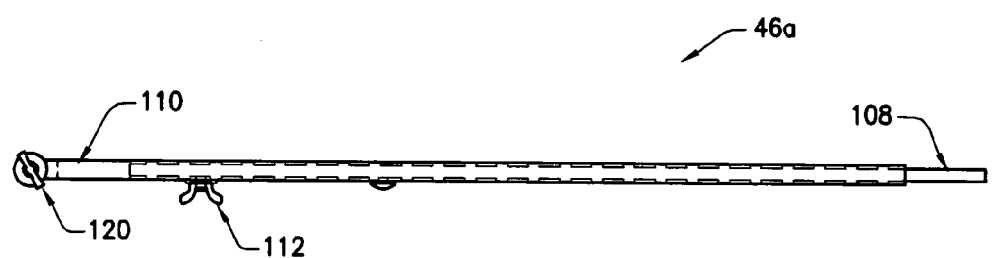
FIGS. 10A-10B are, respectively, plan and elevational views of one of the selectively extensible leg members of the apparatus that mount to the dual-ring assembly of FIGS. 7A-7B.
Figure 10B:
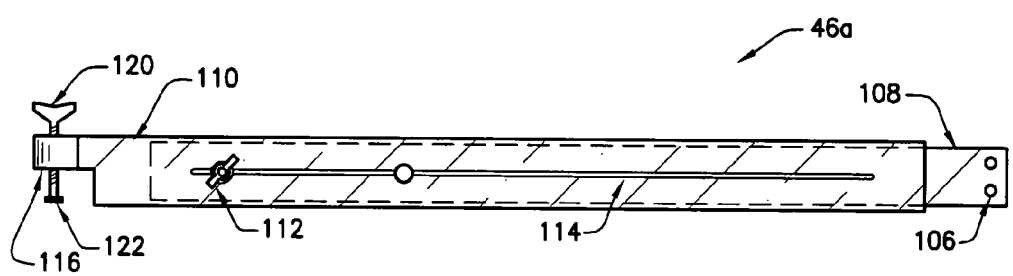

As can be seen in FIG. 10b, each of the leg members 46a-c has an inner bar portion 108 and an outer sleeve portion 110 that are in sliding engagement, so as to permit the length of the legs to be adjusted as necessary to accommodate openings of varying diameters. A thumbscrew 112 is threaded into the side of the inner rod partway along the length thereof, with the shaft of the thumbscrew extending through a longitudinal slot 114 in the outer sleeve. The outer sleeve can thus be slid over the rod until the desired length is achieved, at which point the thumbscrew 112 is tightened to lock the members together.

The outer end of each of the leg members is provided with an undercut projection 116 for resting on the seat for the manhole cover. A thumb-operated adjuster screw 120 extends vertically through the projection, with a foot 122 being rotatably mounted on its lower end. This enables the operator to adjust the legs and the ring assembly to a horizontal orientation, by simply adjusting the screws 120 up or down to visibly match the manhole lid survey location (the top of the legs being aligned with the rod pin joint). The level adjustment is then performed by means of finger-operated wheels 123a-c that are mounted about the perimeter of the outer ring 84, at positions intermediate the leg brackets 104a-c, and that raise and lower horizontal axis rollers 124a-c that are spaced about and raised slightly above the horizontal flange 90 of the outer ring; as this is done, a vertical gap between the clips 94a-c and the inner ring 82 allows the latter to tilt slightly within the outer ring until a level orientation is achieved.

The foregoing paragraphs describe an embodiment of the present invention in which the structure has the benefits of versatility, durability and ease of use. It will be understood, however, that other structures may be employed in other embodiments that are within the scope and spirit of the invention. For example, a gimball or ball-joint mechanism may be used in place of the dual-ring assembly described above. Similarly, the rod member may employ an articulated or sliding configuration rather than the telescoping mechanism described above. Similarly, other means for adjusting the length of the leg members may be employed.

c. Sensors

Figure 8B:
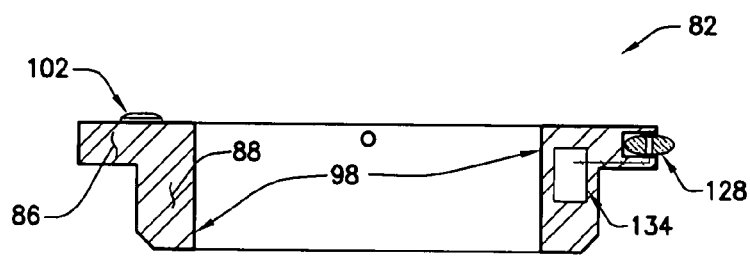

The apparatus of the present invention makes it possible to obtain measurements automatically, in electronic form, using sensors to determine the length and angular orientation of the rod member relative to the manhole opening. As can be seen in FIGS. 8A-8B, the inner ring 82 of the dual-ring assembly includes an internal wheel 125 that bears against the pivot pin 62b of the rod member when the latter is received in channel 10b. The wheel is operatively connected, via a horizontal axle, to an angle sensor 126 that provides a digital output based on rotation of the pivot pin and wheel. In this manner, the angle sensor 126 provides an output representative of the vertical angle of the rod member.

Figure 9A:
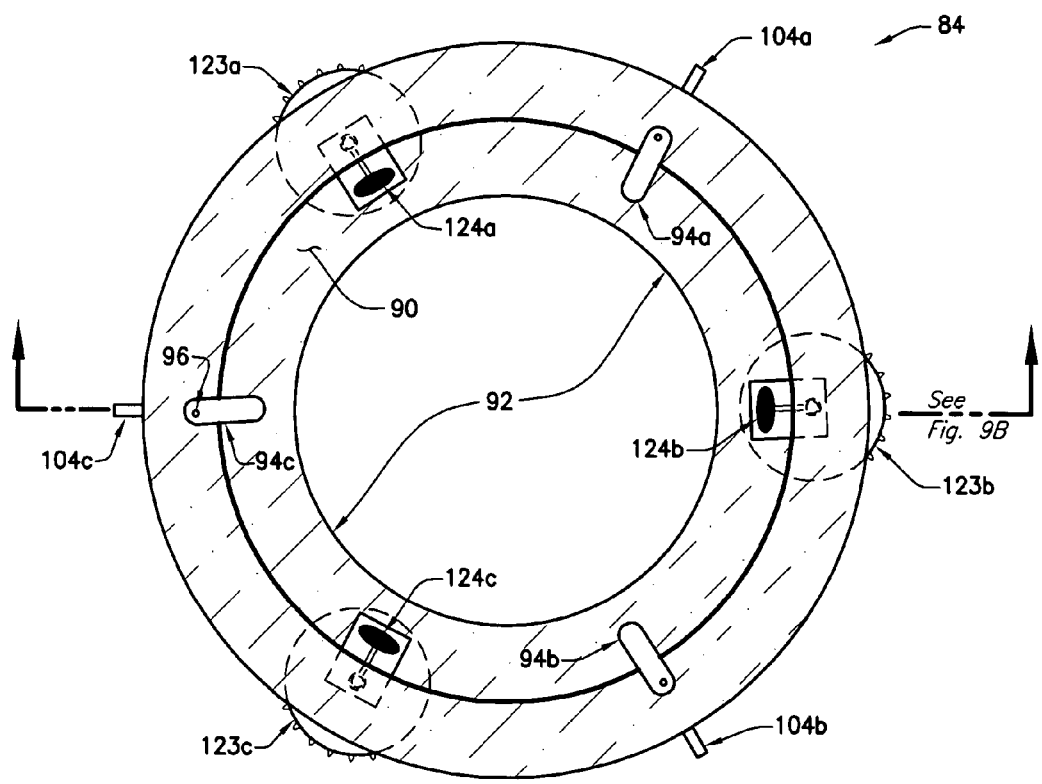
FIGS. 9A-9B are, respectively, plan and cross-sectional views of the outer ring of the dual-ring assembly of FIGS. 7A-7B, that rotatably supports the inner ring and that mounts the leg members of the apparatus which center the ring assembly in a manhole opening.
Figure 9B:
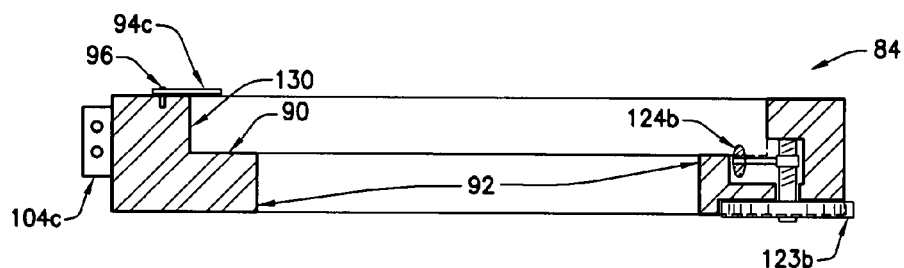

The horizontal angle (i.e., the angle in the horizontal plane), in turn, is determined by means of a second measurement wheel 128, which is mounted on a vertical axis and which protrudes outwardly from the perimeter of the inner ring so as to bear against the cylindrical inner surface 130 of the outer ring (see FIG. 9B). Additional, outwardly-biased (e.g., spring-tensioned) wheels 132a, 132b are mounted about the perimeter of the inner wheel member, generally equidistant from the sensor wheel 128, so as to maintain the latter in firm, balanced frictional engagement with the inner surface of the outer ring. The sensor wheel 128 is operatively connected to an angle sensor 134, which may suitably be the same sensor as the vertical angle sensor 126 described above, i.e., a combination angle sensor unit may be employed; alternatively, there may be separate angle sensor units for the vertical and horizontal measurements. The sensor wheel 128 and angle sensor unit 134 therefore provide a digital output representative of the horizontal angle of the rod member as it and the inner ring are rotated within the stationary outer ring 84. It will be understood that in some embodiments other mechanisms may be utilized to provide the rotational input to the angle sensors in place of the wheels 125, 128, such as gears that engage graduated teeth on the rotating pivoting members.

The third component of the measurement data is the length of the rod member, i.e., the length to which the foot member on its lower end has been extended. This is provided by a third angle sensor, operatively connected by a sensor wheel or other mechanism (not shown) to the axle of the hand crank 60 (see FIG. 5A) by which the length of the rod member is adjusted. The sensor therefore provides an output that corresponds to the number of turns by which the crank handle has been rotated, with the number of turns being calibrated to the change in length of the rod member; alternatively, the sensor may be driven by engagement with the cable that is adjusted by the crank handle rather than the crank handle itself.

Angle sensors providing digital outputs that are suitable for use in the present invention are available from Nobotechnik (155 Northboro Rd., Southborough, Mass.) and other suppliers. Moreover, in some embodiments linear rather than rotary position sensors may be employed. It will also be understood that position/angle sensors that provide analog rather than digital outputs may be employed in some embodiments of the invention, although use of digital-output devices greatly simplifies collection and processing of the information.

d. Setup and Use

The following are example steps illustrating setup and use of a preferred embodiment of the measurement apparatus of the present invention. The steps are arranged substantially in sequential order. However, it will be understood that in some instances, there may be additional or fewer steps and the steps may be practiced in different sequences.

1. Remove rod and attachments from case. Mount rod member to dual ring assembly and attach legs to outer ring.
2. Visually inspect manhole opening and note manhole lid elevation at center where surveyed, as compared with surrounding manhole lid seat; remove manhole lid.
3. Extend/Shorten leg members to fit manhole lid seat; tighten thumbscrew fittings to lock.
4. Insert foot and lower end of rod member into manhole, and rest leg members on inside of lid seat. Adjust elevation of legs using adjuster screws at ends, until elevation at the top of the legs is the same as the removed manhole lid.
5. Use level adjusters on outer ring of dual-ring assembly to adjust inner ring until fish-eye level appears centered.
6. Attach data collector to data port on rod using cable; energize data collector.
7. Perform calibrations and setting adjustments as necessary; generally, settings will need to be calibrated at regular intervals or changed when a different foot, extension, or other attachment is added to the lower end of the rod member which changes the vertical and horizontal reach.
8. Provide data collector with reference location from land survey (ordinarily approximate center of the subject manhole). Enter point to be used as a back sight, or horizontal angle reference, again from previous land surveyed; sight back point using the sight (64) atop the rod member to provide reference direction; if GPS is employed, the reference direction may be true north or other predetermined direction.
9. Move foot member on the lower end of rod member into the invert opening or other selected point/object; data collector displays the rod length, vertical angle and horizontal angle. When one of sensor (80) on end of foot member contacts the opening, the data collector is activated and provides a reading indicating which side of the opening has been contacted. If excessive pressure has been exerted on the foot (possibly causing bending and an erroneous reading), or another reading outside the sensor range is reached, this too is displayed so that the operator can correct accordingly.
10. When the operator has determined that the foot is in contact with the point that is to be recorded (e.g., the bottom center of an invert opening), the operator presses a button and the readings that appear on the data collector are recorded. A description or other comments may be provided in an optional, open text field.
11. Measurement points may be numbered automatically, with the reference survey point number being followed by a simple consecutive numbering system. For example, if a manhole survey point number is 302, then three points (e.g., three inverts) surveyed in that manhole may be 302-1, 302-2, 302-3.
12. The raw data—including the applicable foot sensor reading, rod length, horizontal angle, vertical angle and user description—is suitably recorded in a simple delimited text file based on each point number. The sensor reading may be the applicable contact sensor, or it may be a reading from a flow meter, chemical tester (e.g., H2S sensor) digital photo (from a camera on the foot), or any other data that may be recorded from a sensor mounted on the bottom of the rod or foot.
13. After measurements/raw data have been collected, turn off data collector and disconnect from rod member. The rod member and legs can then be collapsed and/or disassembled for transportation/storage.
14. Download data from data collector, together with data from land survey containing points for centers of manholes and back sights. Use software to calculate heights and orientations of inverts or other features; model manholes and output data in graphic and/or tabular formats.

e. Calculations

Using the embodiment of the invention that is shown in FIGS. 3-4, determination of the position and angular orientation of the measured inverts or other features is obtained from the position sensor data using the relationships set forth below. These calculations may be performed using a laptop computer or other conventional processor; it will be understood that it is within the ability of one of ordinary skill in the relevant art to write software required to implement the calculations and to store the results in a form suitable for subsequent retrieval and manipulation.

Figure 11:
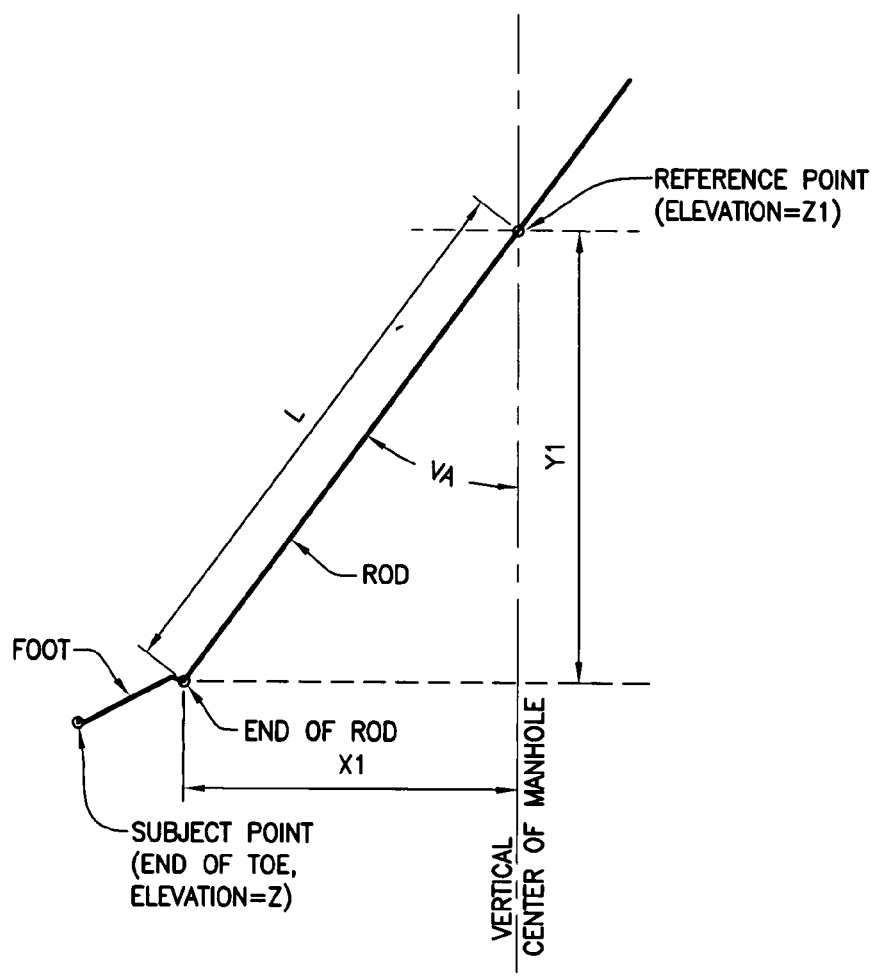
FIGS. 11, 12 and 13 are schematic views of the rod and foot members of the apparatus of FIGS. 3-4, showing these in elevational and plan view and illustrating the variable measurements that are taken by the apparatus and from which the location and angular orientation of the inverts are calculated.
Figure 12A:
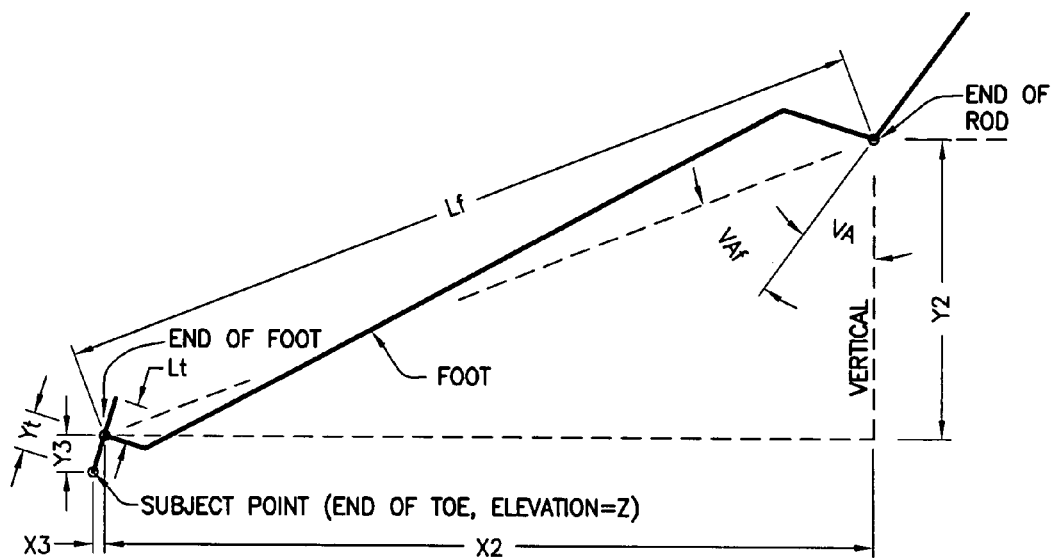
Figure 12B:
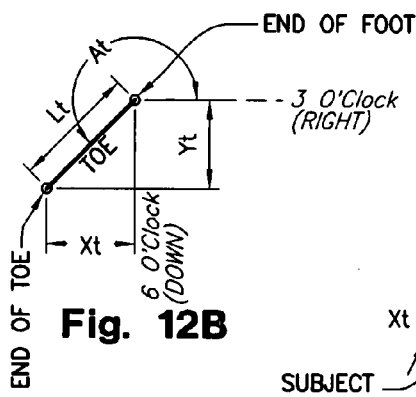
Figure 13:
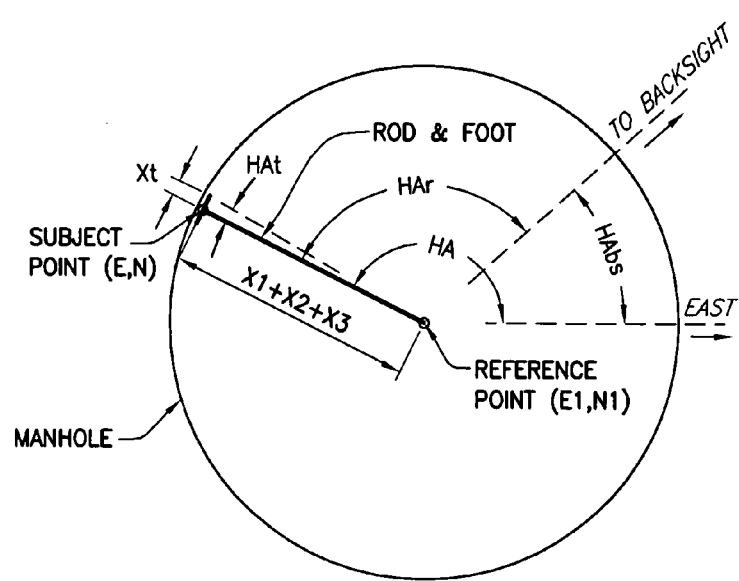

The following variables and calculations refer to the schematic views set forth in FIGS. 11-13.

TABLE 1

| VARIABLES |
| --- |
| VA - Vertical angle of rod |
| L - Length of extended rod |
| HA - Horizontal angle from the north |
| Y1 - Elevation change from rod |
| Y2 - Elevation change from foot |
| Y3 - Elevation change from toe |
| X1 - Horizontal offset from rod |
| X2 - Horizontal offset from foot |
| X3 - Horizontal offset from toe |
| Rf - Radial extension of foot |
| VAf - Vertical angle of foot |
| HAf - Horizontal angle of foot |
| T - Toe length |

TABLE 2

ROD CALCULATIONS $Y1 = L \times \cos(VA)$
$X1 = L \times \sin(VA)$

TABLE 3

FOOT CALCULATIONS $X2 = Rf \times \sin(VAf + VA)$
$Y2 = Rf \times \cos(VAf + VA)$
$X3 = T \times \sin(VA)$
$Y3 = T \times \cos(VA)$
$Z = Z1 - Y1 - Y2 - Y3$ NOTE: THE ELEVATION (Z1) OF THE BASE POINT MUST BE KNOWN TO DETERMINE ELEVATION OF SUBJECT POINT. X3 & Y3 ARE ADDED FOR THE 6 O'CLOCK TOE, AND SUBTRACTED FOR 12 O'CLOCK TOE.

TABLE 4

HORIZONTAL CALCULATIONS $HAf = \arctan \dfrac{(L)}{X1 + X2}$ $N = N1 + (X1 + X2 + X3) \times \sin(HA + HAf)$
$E = E1 + (X1 + X2 + X3) \times \cos(HA + HAf)$ NOTE:
THE ANGLE FROM THE BASE POINT TO THE BACKSIGHT POINT (HAbs), AND THE NORTHING AND EASTING OF THE SUBJECT POINT (N1, E1) MUST BE KNOWN TO CALCULATE NORTHING AND EASTING FOR SUBJECT POINT. HAf IS ADDED FOR 3 O'CLOCK TOE, AND SUBTRACTED FOR 9 O'CLOCK TOE.

The foregoing calculations assume that the rod remains essentially straight, i.e., there is an absence of significant bending. However, if the rod tends to bend or deflect downwardly below the base point 21 (e.g., due to the weight of the foot or an attachment, or of the rod itself), a correction may be applied to the calculations, based on empirically determined values for radii of curvature and chord lengths produced by various lengths/vertical angles of the rod. Alternatively, such values may be calculated based on measurements taken on "real time" basis by sensors on the assembly itself.

f. Direct Horizontal Measurement

Figure 14:
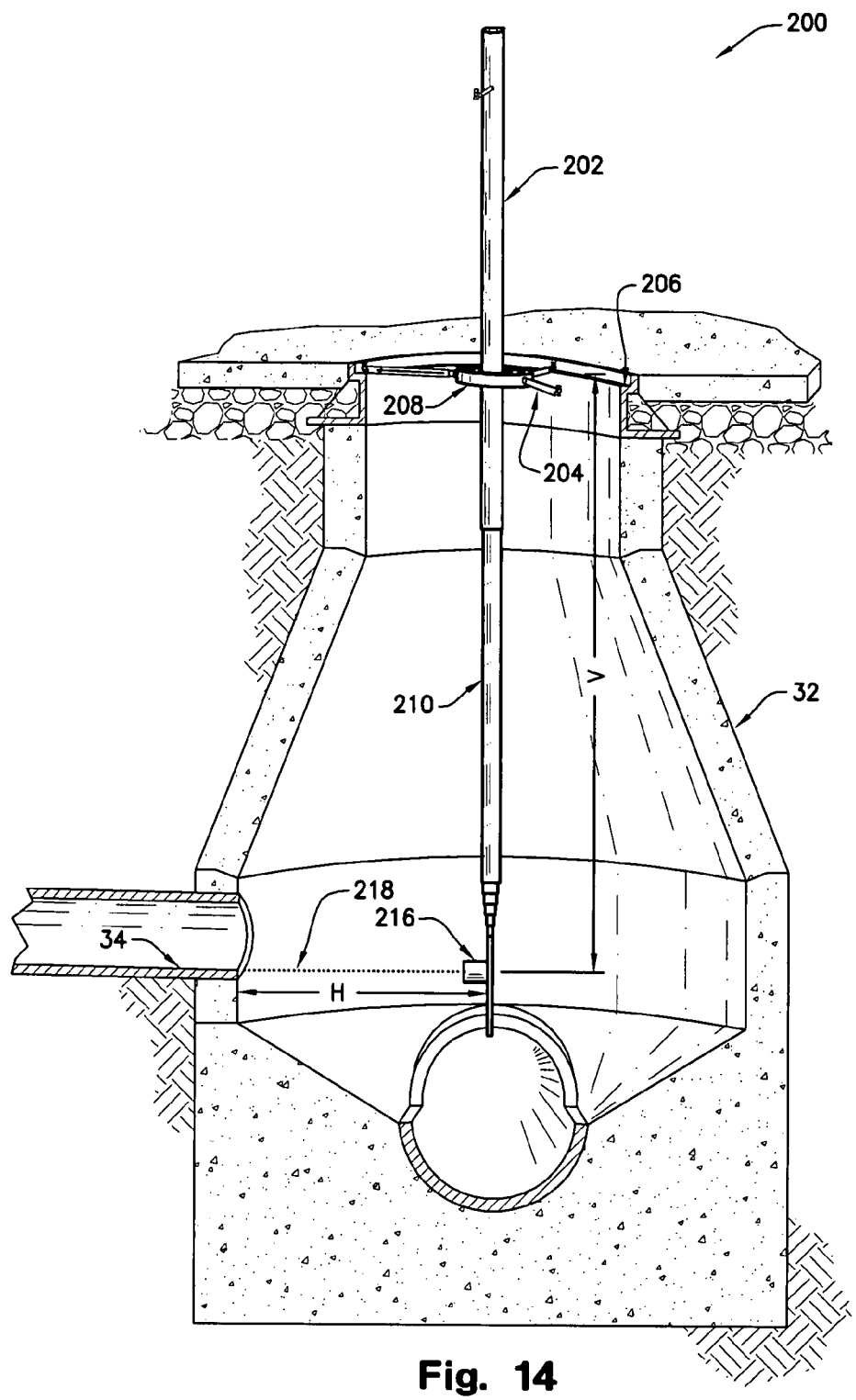
FIG. 14 is an elevational view, similar to FIG. 3, of a measuring apparatus in accordance with a second embodiment of the present invention, in which the rod rotates in the horizontal plane as with the embodiment shown in FIGS. 3-4, but in which the horizontal measurement is taken by a laser distance meter or other electronic measuring device rather than by pivoting the rod in the vertical plane.

FIG. 14 shows a measurement apparatus 200 in accordance with a second embodiment of the invention. The tool is shown installed in a manhole 32 to obtain measurements of an exemplary invert 34, similar to that described above. However, by comparison to the embodiment that is shown in FIGS. 3-4, the tool that is shown in FIG. 14 obtains a direct measurement of the horizontal long distance to the invert or other feature, using a laser distance meter or other electronic distance measuring device rather than by pivoting the rod in the vertical plane.

Figure 15:
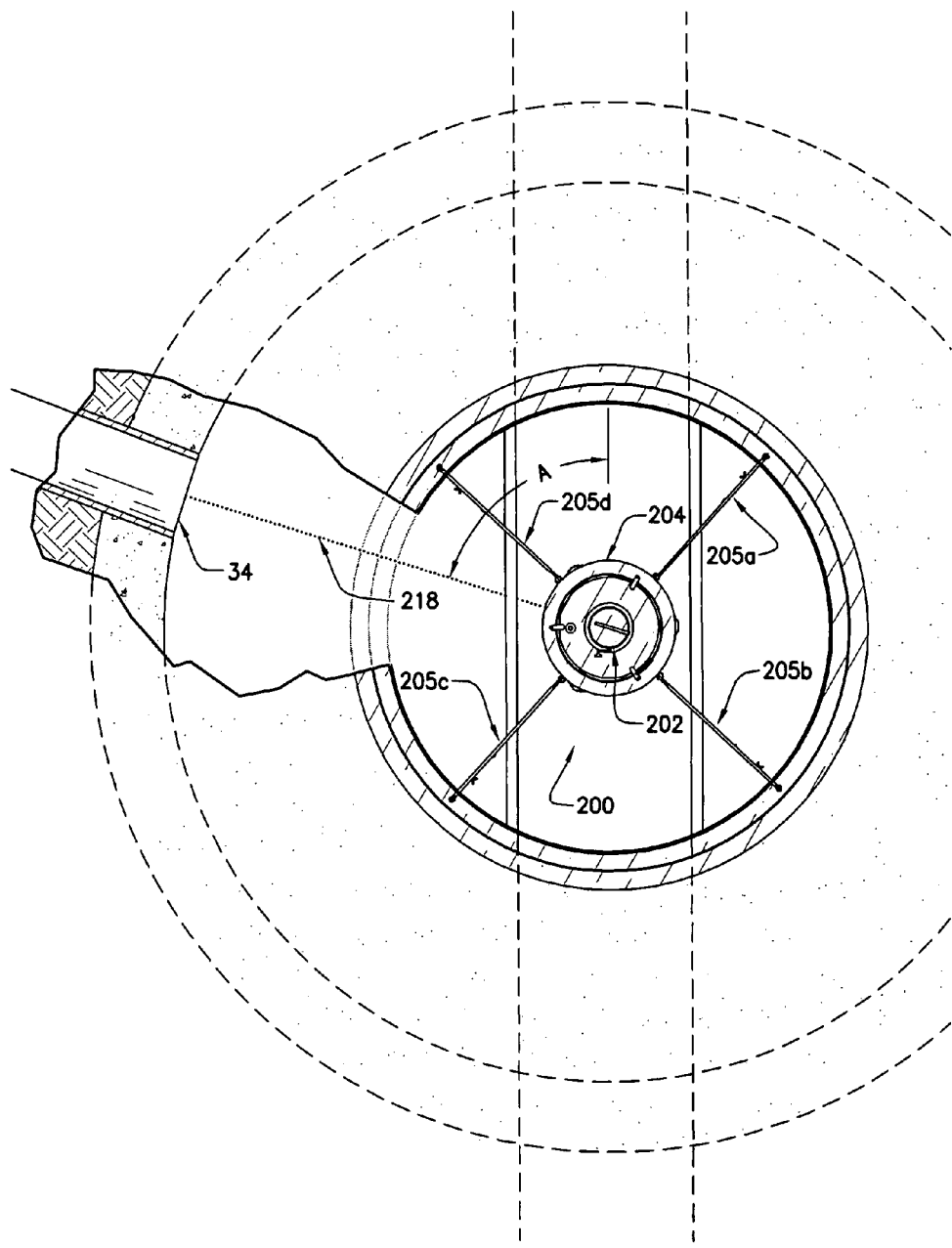
FIG. 15 is a top, plan view, similar to FIG. 4, showing the manner in which the measuring apparatus of FIG. 14 is supported and rotated in a manhole so as to take measurements of selected points or features therein.

Accordingly, as can be seen in FIG. 14, the measurement apparatus 200 includes an elongate, telescoping rod member 202 that is supported centrally the opening of the manhole 32 by a frame 204 that engages the manhole seat 206; as can be seen in FIG. 15, the frame includes a plurality of adjustable, radially extending legs 205a-d, substantially the same as described above. The rod member is supported in the frame in a bearing assembly 208 that allows the rod to be rotated in the horizontal plane, but unlike the bearing assembly described above, does not allow it to pivot in the vertical plane, i.e., the rod is maintained in a vertical orientation.

The lower end portion 210 of the rod member is selectively extensible (e.g., telescoping), in a manner similar to that described above. A camera 212 or other sensor for ascertaining the level of the invert 34 or other selected object is mounted to the extensible end 214 of the rod member; a digital image sensor/camera is preferred in order to facilitate processing the output. Mounted adjacent to or co-axial with the level sensor is an electronic distance measuring device 216 in the illustrated embodiment, the electronic distance measuring device is preferably a laser distance meter, although it will be understood that other types of devices may be utilized; suitable laser distance meters are available from a large number of manufacturers/suppliers, such as, for example, Omron Electronics LLC (Schaumburg, Ill.). Moreover, both the level sensing and distance measurement steps may be carried out using a single device, such as a combination laser distance sensor and two-dimensional CCD camera.

Accordingly, the height of the selected object in the manhole (e.g., invert 34) can be measured by extending/retracting and rotating the lower end portion 210 of the rod member until it is determined by means of the camera 212 that the electronic distance measuring device is level with and in angular alignment (in the horizontal plane) with the object, as indicated by a dotted line 218 in FIGS. 14 and 15. The height of the feature is then calculated from the vertical length "V" of the rod between the reference height at the frame 204 and the camera/measuring device that is positioned level with the feature. The angular position in the horizontal plane, in turn, is determined from the angular displacement "B" of the line-of-sight 218 from the reference angle, as shown in FIG. 15 the angular position of the rod being determined using one or more angle sensors in substantially the same manner as described above. Finally, the distance "H" in the horizontal plane is measured by the laser distance meter or other electronic distance measuring device, again generally along line-of-sight 218; for ease of illustration, the dimension "H" is shown in FIG. 14 as the distance between the measured object and the surface of the lower end 214 of the rod member, however, it will be understood that the measurement will in general be calculated to the vertical centerline rather than the side of the rod. The three-dimensional position of the selected object can be calculated from the values "V", "H" and "B" thus obtained by the tool assembly.

In the embodiment that is illustrated in FIGS. 14-15, the camera and laser distance meter are rotated and lowered/raised by rotating and extending/retracting the rod member 202. It will be understood, however, that in some embodiments these components may be mounted so that they move vertically along and rotate on the rod member while the rod member itself remains stationary and at a fixed length. For example, the camera and laser distance meter may be mounted on an outer ring that is selectively rotated about an inner member by a suitable drive mechanism, for determining the angular position in the horizontal plane, while the inner member is driven vertically along the length of the rod member to obtain the height measurement.

It is to be recognized that various alterations, modifications, and/or additions may be introduced into the constructions and arrangements of parts described above without departing from the spirit or ambit of the present invention as defined by the appended claims.

What is claimed is:

1. An apparatus for obtaining measurements in a manhole, said apparatus comprising:
a rod member for extending downward into a manhole;
a frame for supporting said rod member centrally in an access opening of said manhole;
means mounted to said rod member for obtaining a measurement of a height of a selected object in said manhole in a vertical plane; and
means operatively connected to said rod member for obtaining a measurement of an angular position of said selected object in said manhole in a horizontal plane.

2. The apparatus of claim 1, wherein said means operatively connected to said rod member for obtaining a measurement of an angular position of said selected point in said manhole in a horizontal plane comprises:
a bearing interconnecting said rod member and said frame so as to permit rotation of said rod member in said horizontal plane; and
means for determining an angular position of said rod member in said horizontal plane.

3. The apparatus of claim 2, wherein said means for determining a height of a selected object in said manhole comprises:
a contact member on a lower portion of said rod member for contacting said selected object in said manhole;
means for selectively adjusting a height of said contact member on said rod member;
a bearing interconnecting said rod member and said frame so as to permit pivoting movement of said rod member in said vertical plane; and
means for determining an angular position of said rod member in said vertical plane.

4. The apparatus of claim 3, wherein said means for adjusting a height of said contact member on said rod member comprises:
means for selectively extending and retracting said lower end portion of said rod member on which said contact member is mounted.

5. The apparatus of claim 4, wherein said contact member comprises:
a laterally extending foot member mounted to a lower end of said rod member for being inserted into openings of inverts in said manhole.

6. The apparatus of claim 2, wherein said means for obtaining a measurement of a height of a selected object in said manhole comprises:
a sensor for sensing a level of said selected object in said manhole relative to said sensor; and
means for selectively adjusting a vertical height of said sensor on said rod member so as to determine a point on said rod member that is substantially level with said selected object.

7. The apparatus of claim 6, wherein said means for obtaining a measurement of a height of a selected object in said manhole further comprises:
means for determining a length of said rod member from said frame that supports said rod member to said point on said rod member that is level with the selected object.

8. The apparatus of claim 7, wherein said means for selectively adjusting a height of said sensor on said rod member comprises:
means for selectively extending and retracting said lower end portion of said rod member on which said detector is mounted.

9. The apparatus of claim 6, wherein said sensor comprises:
a camera for visually sensing said selected object in said manhole.

10. The apparatus of claim 6, further comprising:
means for determining a horizontal distance from said selected object in said manhole to said point on said rod member that is level with said selected object.

11. The apparatus of claim 10, wherein said means for determining a horizontal distance from said selected object to said point on said rod member that is level with said object comprises:
an electronic distance measuring device that is mounted to said lower end portion of said rod member.

12. The apparatus of claim 11, wherein said electronic distance measuring device comprises:
a laser distance meter mounted to said lower end portion of said rod member generally adjacent said means for sensing a level of said selected object in said manhole.

13. An apparatus for obtaining measurements in a manhole, said apparatus comprising:
an extensible rod member having a lower end for extending into said manhole;
a bearing assembly mounted to said rod member so that said rod member is selectively rotatable in a horizontal plane and pivotable in a vertical plane; and
means for supporting said bearing assembly in an access opening of said manhole so that said rod member is located centrally therein;
so that said lower end of said rod member can be extended, rotated and pivoted to selected measurement points within said manhole.

14. The apparatus of claim 13, further comprising:
means for determining a length and angular orientation of said rod member when said rod member is in contact with a measurement point in said manhole, so that a location of said measurement point can be calculated therefrom.

15. The apparatus of claim 14, wherein said means for determining a length and angular orientation of said rod member comprises:
at least one angle sensor mounted to said bearing assembly and operatively coupled to said rod member so as to determine an angular orientation of said rod member relative to said bearing assembly.

16. The apparatus of claim 15, whereas said at least one angle sensor comprises:
a first angle sensor operatively coupled to a horizontal axis pivot portion of said bearing assembly for determining an angular orientation of said rod member in a vertical plane; and
a second angle sensor operatively coupled to a vertical axis pivot portion of said bearing assembly for determining an angular orientation of said rod member in a horizontal plane.

17. The apparatus of claim 15, further comprising:
a drive mechanism for selectively extending and retracting said rod member; and
a sensor operatively coupled to said drive mechanism for determining a length of said rod member from operation thereof.

18. The apparatus of claim 13, wherein said rod member comprises:
a telescoping rod assembly having a plurality of nested, tubular rod segments.

19. The apparatus of claim 13, further comprising:
a laterally extending foot member mounted to said lower end of said rod member for being inserted into openings of inverts in said manhole.

20. The apparatus of claim 19, further comprising:
at least one pressure sensor mounted on an outer end of said foot member for indicating physical contact between said foot member and a measurement point within said manhole.

21. The apparatus of claim 13, wherein said bearing assembly comprises:
an outer support for being supported from said manhole opening;
an inner support in engagement with said outer support for rotation in a horizontal plane, said inner support having a central opening with said rod member passing generally vertically therethrough; and
a horizontal axle supporting said rod member from said inner support for pivoting in a vertical plane.

22. The apparatus of claim 21, further comprising:
a plurality of legs mounted to said outer support for supporting said bearing assembly centrally in said opening of a manhole.

23. The apparatus of claim 22, wherein said inner support comprises an inner ring having said central opening and said outer support comprises an outer ring having said legs mounted thereto.

24. An apparatus for obtaining measurements in a manhole, said apparatus comprising:
a selectively extensible rod member having a lower end for contacting a feature in said manhole;
means for supporting said rod member in an access opening of said manhole so that said rod member is selectively rotatable in a horizontal plane and pivotable in a vertical plane so as to move said lower end of said rod member into contact with measurement points within said manhole; and
means for recording, when said lower end of said rod is in contact with a measurement point, (i) a length to which said rod member has been extended into said manhole, (ii) an angular orientation of said rod member in said horizontal plane, and (iii) an angular orientation of said rod member in said vertical plane, so that a location and angular orientation of said measurement points may be calculated therefrom.

* * * * *